April 12, 1932.   A. DINA   1,853,725
METHOD OF AND APPARATUS FOR COOLING FILM TRAPS
Filed Oct. 20, 1926   2 Sheets-Sheet 1

INVENTOR.
BY Augusto Dina.
Howard W. Dix
his ATTORNEY

April 12, 1932. A. DINA 1,853,725
METHOD OF AND APPARATUS FOR COOLING FILM TRAPS
Filed Oct. 20, 1926 2 Sheets-Sheet 2
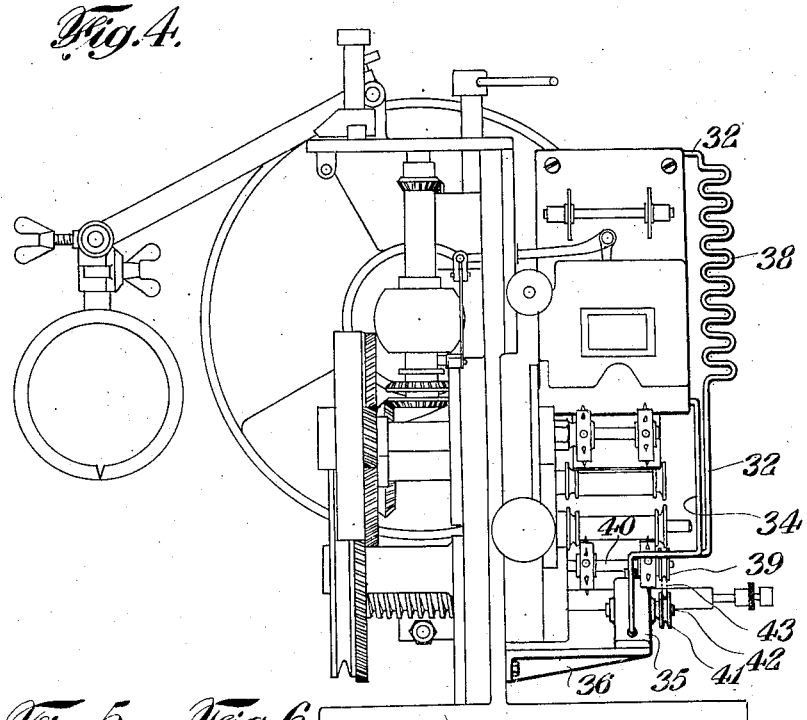
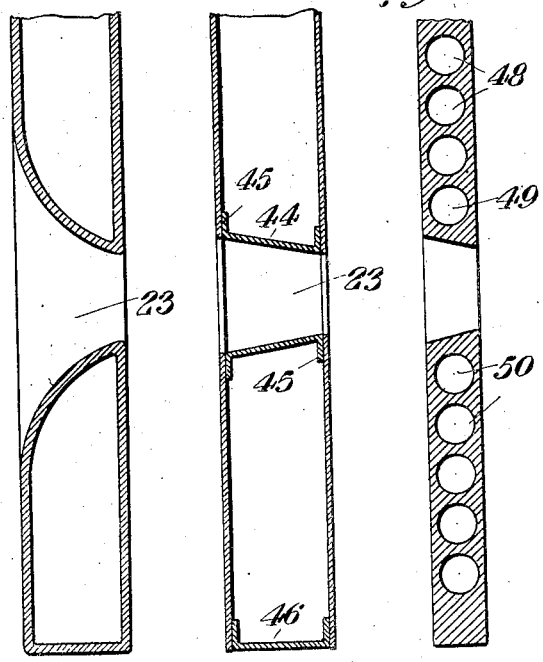
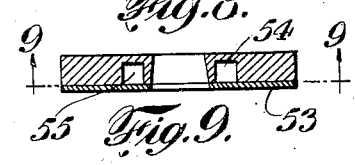
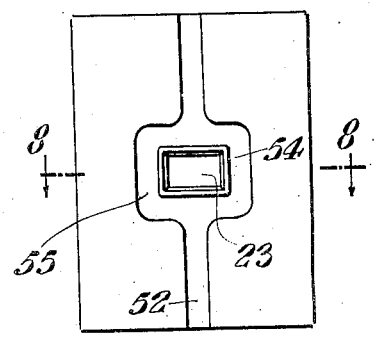
INVENTOR.
Augusto Dino.
BY Howard W. Dix
his ATTORNEY Patented Apr. 12, 1932

1,853,725

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

METHOD OF AND APPARATUS FOR COOLING FILM TRAPS

Application filed October 20, 1926. Serial No. 142,805

The present invention relates to projectors and more particularly to a method and means for reducing the temperature of the portion of film being projected in a projecting machine to prevent fires therein.

Considerable difficulty has been encountered in the use of projecting machines due to the tendency of the portion of the film being projected to ignite. The intense heat of the arc or filament producing the projecting rays, is intensified by the lenses in the machine converging the rays into a light beam, which must be substantially focused on the portion of the film being projected. The excessive heat at this point frequently ignites the film, which, in every instance, necessitates shutting down and rethreading the machine and frequently occasions considerable damage.

The present invention minimizes and substantially eliminates the dangerous effects of the heat rays on the film by creating a localized cooling zone through which the film and the projecting rays pass. Preferably such a zone is formed by circulating a cooling fluid through the aperture plate thereby reducing its temperature and likewise reducing the temperature of the air surrounding it. Since the film adjacent the projecting portion is in contact with this plate, its temperature is reduced prior to entering the projecting rays and the circulation of the fluid about the projection aperture reduces the temperature of the surrounding air at the point of projection. In this manner the film enters the projecting rays at a lower temperature than heretofore and the temperature surrounding the film is likewise lower, both of which minimize the possibility of ignition.

An object of the present invention is a method and means for minimizing the maximum temperature to which films are subjected in moving picture machines during the projecting operation; and to accomplish this by creating a localized cooling zone in the vicinity of the projected portion of the film by means of a fluid circulated through the aperture plate.

A further object of the invention is the provision of an improved aperture plate adapted to permit the circulation of a cooling fluid therethrough to reduce the temperature thereof, particularly in the vicinity of the projection aperture.

Other and further objects of the invention will be obvious upon an understanding of the illustrated embodiment about to be described or will be indicated in the appended claims, and many other advantages other than those herein specifically referred to will occur to one skilled in the art upon employment of the invention in practice.

A preferred embodiment has been chosen for illustration and description and is shown in the accompanying drawings, wherein Fig. 1 is a side elevational view of a projector in accordance with the present invention, the casing of the projector being removed to show the interior thereof;

Fig. 4 is an end view of the projector shown in Fig. 1;

Fig. 5 is a detailed sectional view illustrating one form of aperture plate;

Fig. 6 is a detailed sectional view illustrating another form of aperture plate;

Fig. 7 is a detailed sectional view of a plate having a series of passages for the circulation of a fluid;

Fig. 8 is a horizontal sectional view along line 8—8 of Fig. 9, illustrating a plate particularly adapted for the use of air as a cooling fluid; and Fig. 9 is a sectional view of the plate shown in Fig. 8 taken along the line 9—9 showing the channelled plate with cover removed.

Figure 1:
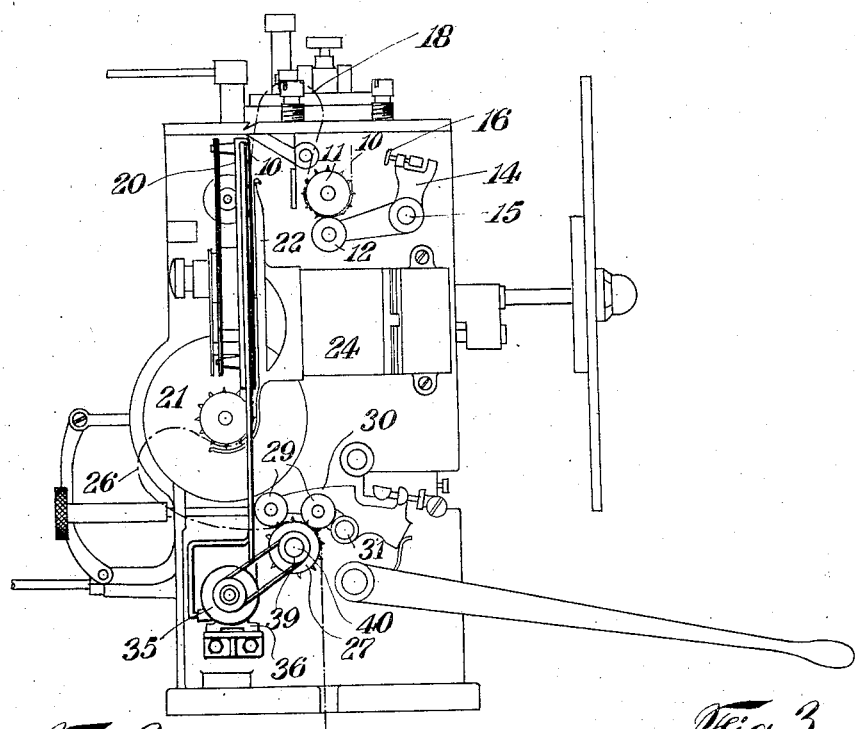

Figs. 1 and 4, of the accompanying drawings, illustrate an embodiment of the present invention applied to a commercial machine for projecting moving pictures commonly known as the Simplex projector. Certain parts only of the machine are shown in detail to illustrate the application of the invention to projecting machines generally; the other parts of the projector will not be described herein, since they are well known in the art.

A film 10, preferably of the type commonly found in moving picture machines, is shown passing over an upper feed sprocket 11 and held in proper position thereon by means of the pad roller 12 mounted on the roller arm 14, pivoted at 15 and adjustably maintained in position by means of the set screw 16. An upper loop 18 is shown between the feed sprocket 11 and an aperture plate 20 to afford ample slack for the proper operation of an intermittent 21. The film passing through the intermittent extends between the usual guides and is held firmly in position against the plate by means of a film gate 22 mounted on the projector lens holder 24. The parts of the projector lens holder are movable to and from the aperture plate to remove the gate and release the film; and suitable springs afford the desired pressure of the gate 22 against the film on the aperture plate so that the film will move and stop accurately in accordance with the motion of the intermittent. A lower loop 26 is formed between intermittent 21 and the lower feed sprocket 27 to permit continuous rotation of the feed roller without affecting the operation of the intermittent. Suitable pad rollers 29 are mounted on an arm 30 pivoted at 31 to hold the film properly on the feed sprocket 27.

Figure 2:
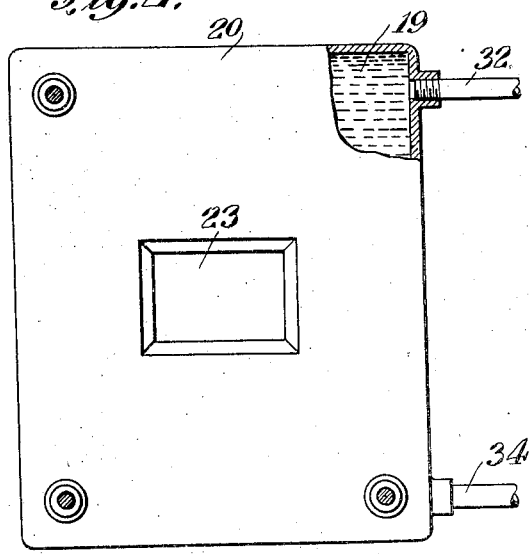
Fig. 2 is an elevational view of an improved form of aperture plate for projecting machines taken along the line 2—2 of Fig. 3.
Figure 3:
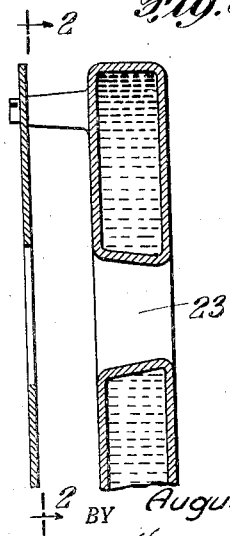
Fig. 3 is a sectional view of the plate shown in Fig. 2.

The aperture plate 20, against which the film is firmly pressed at all times by means of the gate 22 is preferably substantially thicker than commonly found in picture projectors and provided with a space therein which is adapted to receive a cooling fluid. In the form shown in Figs. 2 and 3, the aperture plate may be hollow throughout with pipes 32 and 34 threaded into the upper and lower portion respectively so that a cooling fluid which may be water or the like, may enter at the lower part and leave at the upper part. Such fluid may be obtained from an ordinary faucet or from a pump 35 which may be mounted on a bracket 36 attached to the framework of the machine. Pipes 32 and 34 may be connected respectively to the inlet and outlet of the pump and a cooling coil 38 may be provided for reducing the temperature of the water to the desired degree. Power for the operation of the pump may be obtained from any suitable source, such as a pulley 39 mounted on shaft 40 of the lower feed sprocket 27 with a belt 43 connecting it to a similar pulley 41 on the shaft 42 of the pump 35. It will be understood that in certain instances the pump may be dispensed with and the fluid permitted to circulate in accordance with the temperature variation between the upper and lower portions of the fluid.

Several forms of plates are shown without any intention of limiting the invention to one or all of these. In Fig. 5 a sectional view of a plate is shown having an aperture 23 flared considerably more than the aperture shown in Figs. 2 and 3. In Fig. 6 the aperture 23 is formed by a flared tube 44 of metal fitted into a hollow plate with the flanges 45 on the ends thereof attached to the side of the plate. A flanged strip of metal 46 may be utilized for securing the outer periphery of the plate, thereby obtaining certain advantages and economies in the manufacture thereof. In Fig. 7 a solid plate is shown with a series of passages 48 extending horizontally therethrough so that the fluid will travel through these passages, preferably the coldest fluid being in the passages 49 and 50 adjacent the aperture 23, so that the plate will be coldest in the vicinity of the aperture.

In Figs. 8 and 9 a simple form of the plate is shown which is particularly applicable for the circulation of air, therethrough, although it is also applicable to the circulation of a fluid, such as water, therethrough. A suitable channel 52 is formed along the vertical center of the plate with branches 54 and 55 extending around the aperture to reduce the temperature of the plate particularly in the vicinity of the aperture. A cover 53 is mounted over the plate to close the outer side of the channel 52. Such a plate may be formed by a simple milling operation thus making it inexpensive to manufacture. Further, the ends of the passage 52 may be left open and air will freely circulate therethrough, cooling the plate directly where the film passes thereagainst and particularly in the vicinity of the aperture 23.

In the operation of the machine, a film is threaded through the upper feed sprocket 11, with an upper loop 18, and the projector lens holder is pressed inwardly to remove the gate 22 from the aperture plate, and the film is inserted thereunder. The gate 22 is then permitted to engage the film and hold it in position against the aperture plate. The lower portion of the film is positioned over the intermittent 21 and a lower loop 26 is formed with the end of the film held in position on the lower sprocket 27 by means of the pad rollers 29. The machine is then operated in the usual manner, the intermittent 21 pulling the film the distance of an exposure and then stopping to permit the film to remain in that position for an instant, thereafter moving to the next exposure in the usual manner. The film gate 22 assures accurate movement of the film without vibration. At the same time a suitable arc or filament light is focused upon the film in front of the aperture 23 to project the individual pictures on a suitable screen. The aperture plate 21 is formed with a cavity therein for the circulation of a fluid by means of the pump 35 driven from a pulley on the lower sprocket 27. The fluid is forced into the plate 21 through the pipe or tube 34 and withdrawn therefrom through the pipe 32. The coil 38 permits sufficient cooling of the fluid prior to its return to the pump and redelivery to the aperture plate.

In this manner the entire aperture plate is thoroughly cooled and particularly the portion adjacent the aperture 23 where the projected rays pass. The film, as it passes the aperture 23 in contact with the aperture plate, has its temperature reduced to a minimum. Further, the circulation of the fluid adjacent the aperture 23 cools the air in the vicinity of the projected rays thereby decreasing the temperature of the space through which the film must pass. The temperature of the film is reduced and in addition the temperature of the space through which the film passes is likewise reduced, thereby minimizing and substantially eliminating the danger of ignition due to the converged rays of the projecting machine.

It will be seen that an improved form of aperture plate has been provided which is simple in construction and readily manufactured from commercial material. The cavity therein permits a cooling fluid to be circulated reducing the temperature of the plate and the surrounding atmosphere to minimize the dangers of fire. Further, a simple and effective pumping mechanism is provided for circulating the fluid, all of which may be readily attached to machines now in use without material change of the elements therein. All parts are rigid in construction and fully capable of withstanding the rough usage to which they may be subjected.

As various changes may be made in the above embodiment without departing from the spirit of the invention, all matter herein set forth is to be interpreted as illustrative and not in a limiting sense as the scope of the invention is defined in the claims.

Having thus described my invention, I claim:

1. As an article of manufacture, a metallic aperture plate for projectors and the like having integral imperforate passages therein for the circulation of a cooling fluid about the aperture to reduce the temperature of a film passing thereover.

2. As an article of manufacture, a metallic aperture plate of substantial thickness for projectors and the like having an internal imperforate passage therein for the circulation of a cooling fluid, said passage substantially encircling the aperture in said plate to reduce the temperature thereabout.

3. As an article of manufacture, an aperture plate for projectors and the like having an imperforate passage therein for the circulation of a cooling fluid for prevention of film fires, said passage extending upwardly along substantially the center of said plate and branching intermediately of its length to enclose the projection aperture therein to reduce the temperature thereabout.

4. As an article of manufacture, a metallic aperture plate for projectors and the like having an integral film-engaging surface and having an imperforate passage extending vertically upward through substantially the center of the plate and substantially encircling the projection aperture therein and having an outlet at the upper edge of the plate, whereby air may freely circulate therethrough to reduce the temperature of the plate.

5. In a projecting machine, the combination of an aperture plate having a cooling-fluid passage therein, means for projecting a beam of light through the aperture in said plate, mechanisms for moving a film over said aperture, said mechanisms including at least one part which rotates at a uniform rate, means for circulating a cooling fluid through said passage adjacent the film being projected to prevent ignition thereof and mechanism operatively connected to said uniformly rotating part for driving said fluid circulating means.

6. As an article of manufacture, an aperture plate for projectors and the like, said aperture plate comprising front and back walls, side walls together with an imperforate aperture wall, the whole defining the space around and about the aperture and out of direct fluid contact therewith and means in the aperture plate for the introduction and removal of a cooling fluid.

7. As an article of manufacture, an aperture plate for projectors having spaced front and back walls and a light aperture in said plate and through said walls; means in said plate for cooling the latter, said means comprising a plurality of substantially parallel tubular apertures passing through the plate and out of contact with the light aperture.

8. As an article of manufacture, an aperture plate for projection machines comprising a solid body portion of substantial thickness having a light receiving aperture therethrough, a channel in said plate and about said aperture but out of contact therewith, passages from said channel to the edges of the plate, and a cover plate adapted to cooperate with said channel and passages to form a fluid tight conduit, said cover plate having an aperture in register with the light receiving aperture in the body of the plate.

9. In a moving picture projector, having a film guide, a heat dissipating chamber of substantial thickness adjacent said guide thereby to protect the film and guide from heat, and having an unobstructed rectangular opening therethrough for the projecting rays of light and having provision to supply a circulating cooling liquid to said device and to remove said liquid therefrom.

AUGUSTO DINA.